April 7, 1970 — R. B. SHAW, JR., ETAL — 3,504,559
STEPPED DRIVE MECHANISM
Filed April 24, 1968
FIG. 1
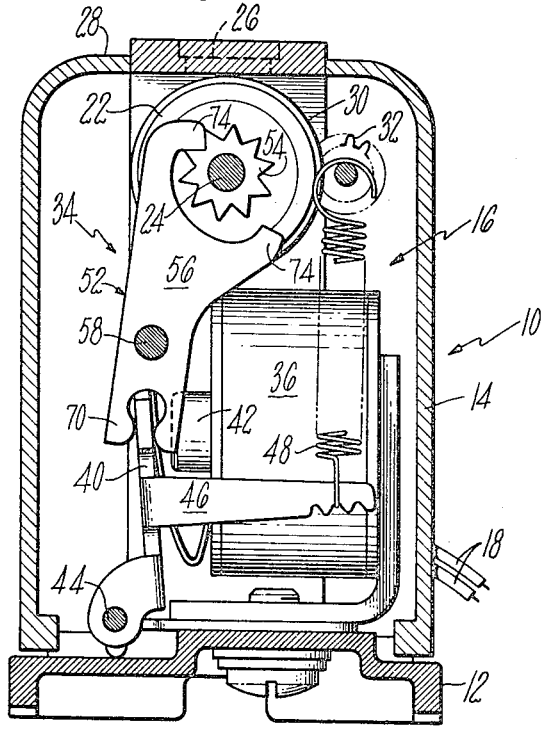
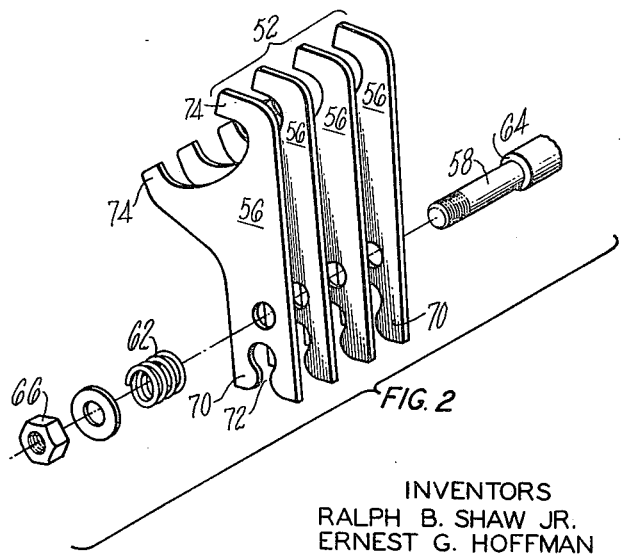
FIG. 2
INVENTORS
RALPH B. SHAW JR.
ERNEST G. HOFFMAN
BY *Lindsey, Prutzman and Hayes*
ATTORNEYS

United States Patent Office 3,504,559
Patented Apr. 7, 1970

3,504,559
STEPPED DRIVE MECHANISM
Ralph B. Shaw, Jr., Manchester, and Ernest G. Hoffman, Hamden, Conn., assignors to Veeder Industries Inc., Hartford, Conn., a corporation of Connecticut
Filed Apr. 24, 1968, Ser. No. 723,693
Int. Cl. F16h 27/00; C05g 5/18
U.S. Cl. 74—143
11 Claims

ABSTRACT OF THE DISCLOSURE

A verge drive for a magnetically actuated counter includes a laminated verge drive arm consisting essentially of a plurality of thin, parallel plates in side-by-side operative relationship. The plates are coaxially mounted for movement in substantial unison but also are independently rotatable relative to each other.

BRIEF DESCRIPTION OF THE INVENTION

The present invention relates to a drive for counters and the like. In particular, it is directed to a new and improved stepped drive mechanism for advancing the number wheels of a magnetically actuated counter.

A primary object of the present invention is to provide a new and improved drive mechanism including a new drive arm construction which substantially extends the operating life of those devices in which it is employed while at the same time accommodating and obviating manufacturing variation and tolerances, all without adversely affecting the efficiency or accuracy of the devices.

Another object of the present invention is to provide a new and improved stepped drive suitable for use in counters and the like, the drive incorporating a composite construction believed to absorb and substantially reduce the mechanical shock loads within the stepped drive system thereby contributing to its unexpectedly prolonged durability.

Still another object of the present invention is to provide a new and improved verge drive particularly well suited for magnetically actuated counters and the like, the verge construction permitting sequential driving action and distribution of the sharp, high impact conditions and rapid acceleration and deceleration heretofore associated with the driving action of the verge.

A further object of the present invention is to provide a new and improved magnetically actuated counter of the type described which exhibits increased durability and extended operating life by means of a relatively simple, economically desirable and functionally beneficial modification in the verge drive of the mechanism.

Other objects will be in part obvious and in part pointed out more in detail hereinafter.

These and related objects of the present invention are achieved by utilizing a particular verge drive connection which incorporates a composite or laminar drive construction consisting of a plurality of thin, resilient, impact absorbing panels. The verge panels are coaxially mounted for substantial synchronism of action, yet exhibit free and independent relative rotation which reduces excessive wear and promotes extended trouble-free operation.

The invention accordingly consists in the features of construction, combination of elements and arrangement of parts which will be exemplified in the construction hereafter set forth and the scope of the application which will be indicated in the appended claims.

BRIEF DESCRIPTION OF THE DRAWING

In the drawing:
FIG. 1 is a transverse sectional view of a magnetically actuated counter showing an embodiment of the verge drive connection of the present invention; and
FIG. 2 is an exploded perspective view of a composite verge arm construction utilizable in accordance with the present invention.

DESCRIPTION OF THE PREFERRED EMBODIMENT

Referring now to the drawing in greater detail, wherein like reference numerals indicate like parts throughout the figures, there is shown in FIG. 1 a general purpose magnetic counter 10 having a base plate 12 mountably supporting a housing 14 of U-shaped cross section within which is encased a suitable counting mechanism, generally designated by the numeral 16. The counting mechanism is provided with electrical leads 18 extending out of the housing by which the mechanism receives appropriate signals for registering a count. The mechanism 16 conventionally includes a bank of coaxially aligned number wheels 22 rotatably supported on shaft 24 adjacent a read-out window 26 located in the front face 28 of the housing 14. Each number wheel 22 generally carries certain indicia, such as the numerals 0 through 9 on its arcuate peripheral surface 30 so that such indicia are successively exposed to the read-out window 26 as the wheels are advanced in response to the electrical signal. The wheel supporting shaft 24 is fixedly carried by the housing 14 which also supports a plurality of suitable transfer pinions 32 operatively associated with the number wheels 22 for providing the proper count transfer therebetween and sequential operation thereof.

The stepwise indexing of the number wheels 22 is accomplished through a verge drive connection, generally designated 34, which is similar in construction and operation to the device described in greater detail in James P. Barrett's pending United States Patent application Ser. No. 532,788 filed Mar. 8, 1966, now patent No. 3,461,277 and entitled "Magnetic Counter," assigned to the assignee of this application. As shown, the counter herein includes an electromagnet 36 which, upon receipt of the signal, is activated to attract a flat clapper plate 40 toward its center core 42 causing pivotal clockwise rotation thereof as viewed in FIG. 1 about its pivot pin 44. As in the aforementioned application, the clapper plate 40 is provided with an elongated drive arm 46 extending integrally from the plate and adapted to receive one end of the drive spring 48. As will be appreciated, the electrical signal received by the electromagnet 36 provides only a momentary magnetic force of sufficient duration and strength to attract the clapper plate 40 to the core 42 against the bias of the return drive spring 48. The clockwise movement of the clapper as viewed in FIG. 1 thus loads the spring 48 so that as soon as the signal terminates the spring is effective in moving the clapper away from the core and returning it to the rest position shown in FIG. 1.

As is well known, this oscillating action of the clapper plate is accompanied by synchronous oscillatory motion on the part of a verge arm 52 which in turn drives a star-shaped ratchet wheel 54 operatively connected for indexing of the counter wheels 22. In the embodiment illustrated the ratchet wheel 54 is mounted for rotation on the shaft 24 coaxially of the number wheels and is interconnected with the lowest order number wheel by means not shown for advancing the exposed indicia thereon in response to the signal received by the electromagnet.

In accordance with the present invention, it has been unexpectedly found that an increase in the operating life of a magnetic counter to the extent of a 100 percent increase and more can be effectuated by the use of a composite member in the verge drive mechanism, so long as the individual components or parts of the composite member are permitted a limited degree of independent relative movement. In the embodiment best illustrated in FIG. 2, the verge arm 52 is of composite construction consisting essentially of a plurality of relatively thin, substantially identical verge plates or leaves 56 coaxially mounted in parallel side-by-side relationship on the fixed pivot pin 58. The individual plates 56 of the laminated construction are held in intimate surface contact by means of a resilient retainer such as a spring 62 which forces an end plate of the composite arm 52 against the shoulder 64 of the pin 58 as the nut 66 adjustably controls the compression of the spring against the composite verge arm construction.

As indicated hereinbefore, each of the individual verge arm plates 56 is independently rotatable about the pin 58 although the frictional surface contact between the plates tends to promote a high degree of regimentalized motion whereby the arm functions as a unit. Each plate 56 of the arm is provided with a bifurcated tail portion 70, with the bifurcating notch 72 thereof being of sufficient size to readily accommodate a portion of the clapper plate 40, as illustrated in FIG. 1. Each plate 56 additionally provides a pair of opposed jaw-like pawls 74 which cooperatively contact successive teeth on the star-shaped ratchet wheel 54 to drive the ratchet wheel in the clockwise direction as viewed in FIG. 1. Since each electrical signal received by the electromagnet generally represents one full count, the ratchet wheel 54 is suitably connected to the lowest order number wheel for providing a half count advance of the number wheel as a result of the driving rotation provided by each pawl of the verge arm. Thus, a complete operating cycle will result in a one half count indexing of the number wheels by the driving force of the electromagnet 36 and the other half count indexing by the return drive spring 48.

As can be appreciated, any misalignment between the number wheel shaft 24 and the verge pivot pin 58 will tend to cause some wear. Additionally, wear on the number wheels by the abrupt, high impact encountered between the various parts and the rapid acceleration and deceleration thereof can have an appreciable effect in limiting the operating life of the counter. However, in accordance with the present invention, it has been found that the laminar construction of the verge drive provides a substantial decrease in wear and a corresponding increase in operating life. In fact, the result is frequently a multifold extension in operating life. Although the invention should not be limited to a particular theory of operation, it is believed that the resiliency, and to a lesser degree the surface friction, provided by the plural plates or leaves of the verge arm tend to absorb and reduce the impact loads which are imparted to the bank of number wheels during the indexing operation. Additionally, it is possible that the deleterious forces acting on the counter are beneficially distributed by the independent relative movement of the plates. In this connection the present invention contemplates shimming of the plates to a minimum clearance with or without a lubricant. Certainly, it is clear that the sequential operation of the individual verge plates, albeit in substantial unison, will accommodate manufacturing advantages regardless of the theory of operation or the correct explanation for the increased operating life span of devices utilizing the present invention.

As will be apparent to persons skilled in the art, various modifications and adaptations of the structure above-described will become readily apparent without departure from the spirit and scope of the invention, the scope of which is defined in the appended claims.

We claim:

1. In an electromagnetic counter having a count input, a driven number wheel for registering the count, and a drive mechanism responsive to the input for stepped indexing of the number wheel in one direction, the drive mechanism having a drive member movable between first and second positions in response to activation of the input and a driven member operatively connected to the driven number wheel for indexing thereof in response to movement of the drive member between its first and second positions, the improvement wherein one of said members is a laminated composite having a plurality of plates mounted for independent relative movement and operation substantially in unison.

2. The counter of claim 1 wherein the driven member is a ratchet wheel and the drive member is mounted for reciprocable movement and includes a pair of opposed pawls cooperating with the ratchet wheel for stepwise rotation of the wheel upon reciprocable driving movement of the drive member, each of said pawls forming at least a part of the composite and comprising a plurality of thin plates mounted in side-by-side relationship.

3. The counter of claim 1 wherein the drive member is the composite and is mounted for reciprocable movement, the plates of the composite being compressively mounted for independent relative movement.

4. The counter of claim 1 wherein the count input includes an electromagnet, the drive member is a magnetically responsive element movable toward and away from the electromagnet in response to an electrical signal received by the electromagnet and the driven member is the composite.

5. The counter of claim 1 wherein the drive member is a verge arm mounted for reciprocable motion in response to the activation and deactivation of the count input, the verge arm being provided with a pair of opposed pawls for operative stepwise indexing of the number wheel upon reciprocable movement of the arm, the verge arm consisting essentially of a plurality of plates mounted in side-by-side relationship and resiliently urged into compaction to frictionally limit the independent relative movement thereof.

6. The counter of claim 1 wherein the count input includes an electromagnet activatable by an electrical signal and the drive mechanism includes a drive spring loaded upon activation of the electromagnet and operable upon deactivation thereof, a verge arm drivingly connected to the electromagnet and the drive spring and pivotally mounted for movement in a forward direction in response to the driving action of the activated electromagnet and in a reverse direction under the bias of the drive spring, and a rotatable ratchet wheel mounted for rotatably driving the driven number wheel, the verge arm being provided with a pair of opposed pawls cooperating with the ratchet wheel for stepwise rotation of the ratchet wheel upon reciprocable driving movement of the arm by the electromagnet and the drive spring, the verge arm consisting essentially of a plurality of thin, flat verge plates coaxially mounted in side-by-side abutting relationship and resiliently urged into intimate frictional engagement with each other.

7. The counter of claim 1 wherein the plates of the laminated member are substantially identical and include pawls of identical configuration in substantial side-by-side alignment.

8. In a drive mechanism having a rotatable output and an actuator subassembly operable for rotatably driving the output in a stepwise unidirectional manner, the improvement wherein the actuator subassembly includes a laminated verge drive member comprising a plurality of plates mounted for substantial unity of operation and limited independent relative movement therebetween.

9. The drive mechanism of claim 8 including first and second drive means and wherein the laminated drive member is mounted for reciprocable movement in forward and reverse directions, the first drive means being operative for driving the laminated drive member in a forward direction and the second drive means being operative for driving the laminated drive member in a reverse direction.

10. The drive mechanism of claim 8 wherein the plates are mounted in parallel side-by-side relationship and are compressively urged into compaction to provide frictional resistance to independent relative movement therebetween.

11. The drive mechanism of claim 8 wherein the plates of the laminated member are substantially identical and include pawls of identical configuration in substantial side-by-side alignment.

References Cited

UNITED STATES PATENTS

| | | | |
|---|---|---|---|
| 376,467 | 1/1888 | Ballew | 74—158 |
| 447,648 | 3/1891 | Sutherland | 74—158 |
| 1,979,028 | 10/1934 | Ewart | 74—143 |
| 2,426,715 | 9/1947 | Tatter | 74—143 |
| 2,596,370 | 5/1952 | Bush | 74—575 |
| 3,373,622 | 3/1968 | Stautmeister | 74—143 |

FRED C. MATTERN, Jr., Primary Examiner

W. S. RATLIFF, Jr., Assistant Examiner

U.S. Cl. X.R.

74—575